Jan. 16, 1962 C. A. MOELLER, JR 3,016,915
VALVE
Filed Sept. 24, 1959
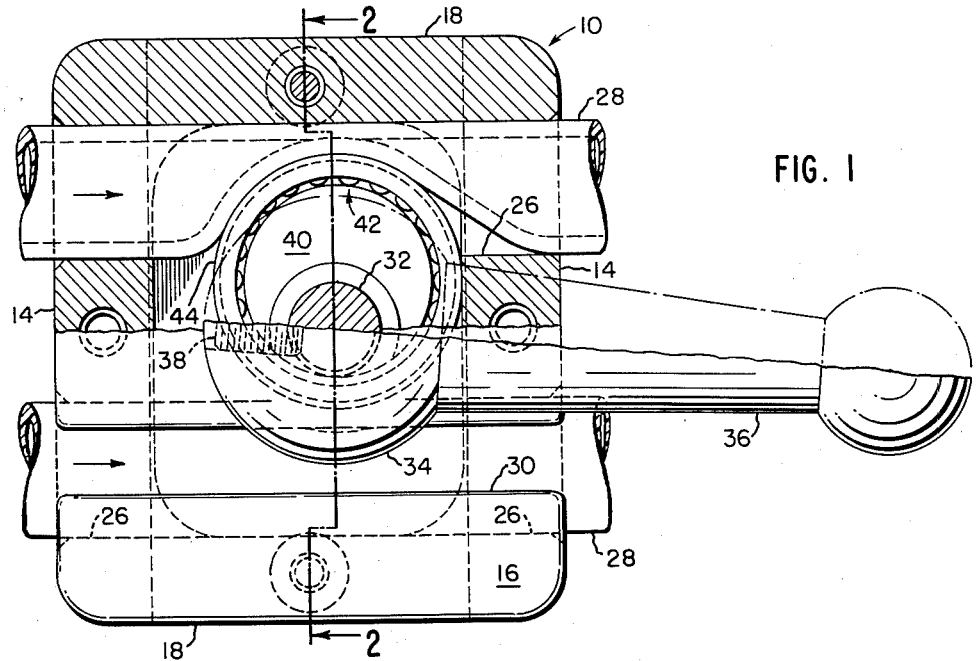
FIG. 1
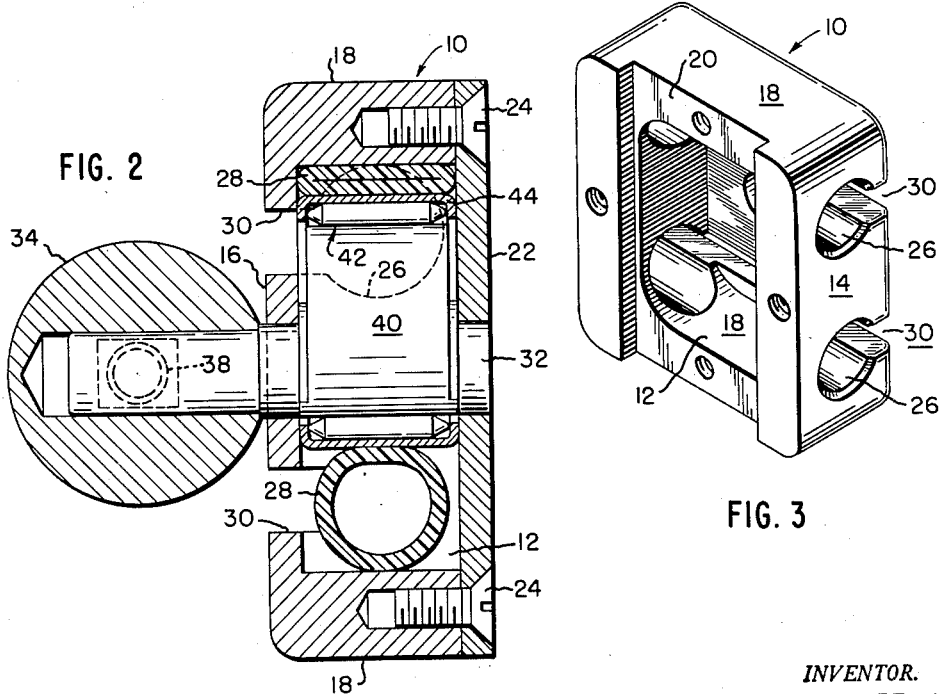
FIG. 2
FIG. 3
INVENTOR.
CARL A. MOELLER, JR.
BY
ATTORNEYS

United States Patent Office 3,016,915
Patented Jan. 16, 1962

3,016,915
VALVE
Carl A. Moeller, Jr., Randolph, Mass., assignor to Image Transfer Incorporated, Randolph, Mass., a corporation of Massachusetts
Filed Sept. 24, 1959, Ser. No. 842,094
4 Claims. (Cl. 137—595)

This invention relates to a novel and improved double acting valve particularly suited for controlling fluid flow through a pair of tubes having resiliently deformable side walls.

In various environments, flexible tubing fabricated from resiliently deformable material is used to conduct fluid from one point to another. Often a plurality of such tubes are utilized where it is desired to selectively connect one fluid or another to a device. In such cases, it is often desirable to provide means to quickly and positively halt fluid flow through one tube while at the same time initiate fluid flow through another such tube. While it is obvious that the fluid flow in any one of the tubes may be controlled by splitting the tube intermediate its ends and inserting a conventional valve, it is often not desirable or expedient to split the length of tubing, thus rendering the tube suitable for only the particular installation concerned. In those cases where it is not desirable or expedient to cut the tubing to permit connection to a conventional valve, fluid flow through the tubing may, of course, be controlled by a conventional tube clamp. However, such clamps are often relatively slow operating, and with a pair of such clamps it is very difficult to accurately relate the halting of fluid flow in one tube and initiation of fluid flow in another tube.

Accordingly, it is the primary object of this invention to provide a novel and improved double acting valve for controlling the fluid flow through a pair of tubes having resiliently deformable side walls which will provide for the halting of fluid flow through one tube while simultaneously providing for the initiation of fluid flow in the other tube.

It is another object of this invention to provide a novel and improved double acting valve of the type described which may be applied to a pair of such tubes for the control of fluid flow therein without requiring any cutitng or splitting of the tubes.

It is another object of this invention to provide a novel and improved double acting valve of the type described which will be quick acting and will provide positive and accurate control of fluid flow in the tubes to which it is applied which at the same time will have few parts so as to be relatively economical to fabricate while at the same time will be rugged and dependable so as to provide trouble-free operation over an extended service life.

Other objects and advantages of this invention will be apparent from a consideration of the following detailed description of a specific embodiment of the invention when taken in connection with the accompanying drawing in which:

FIG. 1 is a plan view, partly in section, of a double acting valve constructed in accordance with this invention;

FIG. 2 is a cross sectional view substantially along the line 2—2 of FIG. 1; and FIG. 3 is a reduced perspective view of the valve body of the valve of FIG. 1.

With reference to the drawing, a preferred embodiment of a double acting valve constructed in accordance with this invention comprises a valve body 10 which as shown most clearly in FIGS. 2 and 3 is provided with a recess 12 extending upwardly from the bottom of the body. The recess 12 is defined in part by a pair of parallel spaced apart end walls 14 depending from the top wall 16 of the valve body. The recess 12 is further defined by a pair of side walls 18 also depending from the top wall 16 and extending at right angles to the end walls 14. The side walls 18 are recessed on their lower edges as shown at 20 in FIG. 3 to provide a recessed mounting for a bottom plate 22, which as best shown in FIG. 2 is secured to the bottom of the side walls 18 by a pair of screws 24.

Each end wall 14 is provided with a pair of tube receiving apertures 26 which are spaced apart from each other sufficiently so that the bordering edge portions of the apertures next adjacent the outer ends of the end walls are disposed next adjacent the inwardly facing surfaces of the side walls 18. The apertures 26 in each end wall are coaxially aligned with the apertures 26 in the other end wall so that there are provided in the valve body two pairs of coaxially aligned apertures having their axes disposed in parallel spaced relation.

As clearly shown in FIGS. 1 and 2, the apertures 26 are adapted to receive a pair of equal diameter tubes 28 having resiliently deformable side walls of equal thickness. The tubes extend between the end walls 26 with the sides thereof facing in opposite directions and away from each other being juxtaposed with the inwardly facing surfaces of the side walls 18. The top wall 16 is provided with a pair of slots 30 extending respectively between each pair of coaxially aligned apertures 26 and communicating therewith to provide means for inserting the tubes 28 within the apertures 26 by moving the tubes laterally relative to and into the apertures.

As best shown in FIGS. 1 and 2, a shaft 32 extends at right angles between the tubes 28 and is journalled at one end on the bottom plate 22 and intermediate its ends on the top plate 16. The shaft 32 extends outwardly of the top plate 16 and is connected to the spherical end 34 of an operating handle 36 by means of a set screw 38 extending radially inwardly of the end 34 of the shaft and engaging a flat spot on the shaft. As will be apparent, means other than the handle 36 could be provided for the rotation of the shaft 32. The shaft 32 carries with it for rotation a tube engageable cam comprising a cylindrical member 40 which in the specific embodiment is formed integrally with the shaft 32. The cylindrical member 40 is disposed eccentrically of the shaft 32 and carries an antifriction bearing 42 arranged concentrically thereabout. The bearing 42 comprises an outer cylindrical race 44 which is alternately engageable with the tubes 28 to compress one of the tubes between the cam and a side wall 18 so as to positively seal the tube against fluid flow therethrough.

As will be apparent from FIG. 1, the axis of the shaft 32 is spaced from the leftward end wall 14 a distance greater than the major throw of the cam while it is spaced from the rightward end wall 14 a distance substantially less than the major throw of the cam. Accordingly, as the cam is rotated in either direction of rotation, the outer race 44 will engage the right end wall 14 so that the end wall provides stop means to limit rotation of the cam in both directions of rotation thereof. For a reason hereinafter apparent, the spacing of the shaft axis from the rightward end wall 14 is selected to provide that during rotation of the cam into either of its rotational limit positions the major throw of the cam will move through dead center position relative to the tube toward which the major throw of the cam generally extends in its rotational limit position. Thus, in both rotational limit positions of the cam the major throw thereof will extend angularly toward the end wall 14 engaged by the cam. Also, the cam is so constructed that the larger throw of the cam extending at right angles to the tubes 28 when the cam is in either rotational limit position has a length which is less than the spacing of the cam axis from the side walls 18 by an amount less than twice the wall thickness of the tubes. Further, it is preferred that the smaller throw of the cam in dead center relation to the tubes 28 when the cam is in either rotational limit position be less than the spacing of the cam axis and side walls by an amount substantially equal to or somewhat less than the diameter of said tubes.

In use, the valve may be applied to a pair of tubes 28 merely by pressing the tubes through the slots 30 and laterally into the tube receiving apertures 26 in the valve body. As will be apparent from FIG. 1, with the cam in its clockwise rotational limit position, the cam, or more particularly the outer race 44, will clamp one of the tubes 28 against the next adjacent side wall 18 which laterally supports the tube so as to completely collapse the tube and provide positive sealing against fluid flow through the tube. On the other hand, the opposite tube 28 will, as clearly shown in FIG. 2, be substantially undeformed by the cam so as to provide for substantially free fluid flow through this tube. The aforedescribed relationship of the wall thickness of the tubes and the larger throw of the cam in dead center relation to the tubes when the cam is in its limit position of FIG. 1 will assure complete collapse of the tube intended to be closed and at least some compression of the side walls of the collapsed tube to provide positive sealing of the tube. In connection with the positive full sealing feature of the valve, the length of the outer race 44 is substantially greater than the diameter of the tubes 28 when the tubes are in collapsed condition as shown in FIG. 2 so as to provide a bearing area across the full width of the tube when in collapsed condition. The movement of the major throw of the cam through dead center position relative to the closed tube 28 as the valve is moved into its closed position eliminates any tendency for the resilience of the tube walls to cause the valve to open inadvertently. In fact, as will be apparent from FIG. 1, the resilience of the walls of the tubes tends to maintain the valve in its rotational limit position. The maintenance of the valves in a closed position is further enhanced when the valve is applied to the tubes in the manner shown in FIG. 1, wherein the fluid flow through the tubes is from left to right. As will be apparent, fluid pressures within the closed tube will act upon the cam, tending to maintain the cam in its tube closing position.

The provision of the antifriction bearing 42 reduces if not substantially eliminates rubbing and chafing of the tubes during operation of the valve. It will be apparent from the drawing that, with the valve constructed as aforedescribed, during rotation of the operating handle 36 between the rotative limits of the cam, the engagement between the outer race 44 and both tubes 28 will tend to maintain the bearing member 44 fixed relative to the tubes so that substantially the only action of the cam on the tubes is a clamping movement of the race 44 laterally of the tubes.

The double acting valve of the present invention is, of course, useful in controlling either liquid or gas flow in tubes of the type described; and while the invention has been described in terms of a preferred embodiment thereof wherein the valve is utilized to control the flow in a pair of tubes, it will be recognized that a similar construction could be utilized for the control of fluid flow in a single tube. The valve is suitable for remote control by means of a flexible shaft suitably connected to the shaft 32; and further, if desired, a plurality of such valves could be ganged for simultaneous operation. The valve will obviously provide rapid action to close one of the tubes 28 while simultaneously opening the other tube. The positive sealing provided by the valve together with the feature whereby the valve tends to be maintained in its closed position by the resilience of the tubes as well as fluid pressure within the tubes assures prevention of any leakage through the closed tube. The valve is constructed of relatively few parts and is easily disassembled and reassembled merely by the removal of the two bottom plate screws 24 and the set screw 38. Additionally, when the valve is fabricated of stainless steel or other suitable material, it is particularly adapted for medical use, inasmuch as the valve can be fully autoclaved. Thus, it can be seen that there has been provided a novel and improved valve for controlling fluid flow through tubes having resiliently deformable side walls which fulfills all of the objects of the invention outlined above.

I claim:

1. A double acting valve for controlling fluid flow through a pair of tubes having resiliently deformable walls of predetermined thickness comprising a valve body having a top wall and a pair of spaced apart end walls depending from the top wall, the end walls being provided with two pairs of coaxially aligned tube receiving apertures, the top wall being provided with a slot connecting each pair of apertures for the insertion of the tubes laterally into the apertures whereupon the tubes will extend between said end walls, a tube engageable cylindrical cam eccentrically mounted on said body for rotation about an axis extending at right angles to and between the axes of said two pairs of tube receiving apertures, support means on the body disposed on the side of each pair of tube receiving apertures opposite the cam axis for laterally supporting the sides of tubes supported on said end walls, the axis of said cam being spaced from one end wall a distance greater than the major throw of the cam and being spaced from the other end wall a predetermined distance less than the major throw of the cam so that in both directions of rotation of the shaft the cam will engage said other end wall to limit rotation of the cam, said predetermined distance being selected so that the major throw of said cam extends from the shaft axis angularly toward said other end wall in both rotational limit positions of the cam, the larger throw of said cam extending at right angles to the axes of said tube receiving apertures when the cam is in either of the limit positions being less than the distance between said side support means and cam axis by an amount less than twice the predetermined wall thickness of the tubes.

2. A double acting valve for controlling fluid flow through a pair of tubes having resiliently deformable walls of predetermined thickness comprising a valve body having a top wall and a pair of spaced apart end walls depending from the top wall, a pair of spaced apart side walls depending from the top wall, the end walls being provided with two pairs of coaxially aligned tube receiving apertures having bordering edge portions next adjacent said side walls, a shaft journalled on said top wall and extending downwardly thereof in centered relation between said side walls, means for rotating the shaft, and a tube engageable cylindrical cam carried by said shaft and mounted eccentrically of the shaft, said cam having a length greater than the diameter of the tubes, the axis of said shaft being spaced from one end wall a distance greater than the major throw of the cam and being spaced from the other end wall a predetermined distance less than the major throw of the cam so that in both directions of rotation of the shaft the cam will engage said other end wall to limit rotation of the cam, said predetermined distance being selected so that the major throw of said cam extends from the shaft axis angularly toward said other wall in both rotational limit positions of the cam, the larger throw of said cam extending at right angles to said side walls when the cam is in either of the limit positions being less than the distance between said side walls and shaft axis by an amount less than twice the predetermined wall thickness of the tubes, the smaller throw of said cam extending at right angles to said side walls when the cam is in either of its limit positions being less than the spacing of said side walls and shaft axis by an amount substantially equal to the diameter of said tubes.

3. A double acting valve for controlling the fluid flow through a pair of tubes having resiliently deformable walls of predetermined thickness comprising a valve body having a top wall and a pair of spaced apart end walls depending from the top wall, a pair of spaced apart side walls depending from the top wall, the end walls being provided with two pairs of coaxially aligned tube receiving apertures having bordering edge portions next adjacent said side walls, the top wall being provided with a slot connecting each pair of apertures for the insertion of the tubes laterally into the apertures whereupon the tubes will extend between said end walls and along said side walls, a shaft journalled on said top wall and extending downwardly thereof in centered relation between said side walls, means for rotating the shaft, and an eccentric cam carried by said shaft including an antifriction bearing mounted eccentrically of the shaft and having a tube engageable cylindrical outer race circumscribing the axis of said shaft having a length greater than the diameter of the tubes, the axis of said shaft being spaced from one end wall a distance greater than the major throw of the cam and being spaced from the other end wall a predetermined distance less than the major throw of the cam so that in both directions of rotation of the shaft the cam will engage said other end wall to limit rotation of the cam, said predetermined distance being selected so that the major throw of said cam extends from the shaft axis angularly toward said other wall in both rotational limit positions of the cam, the larger throw of said cam extending at right angles to said side walls when the cam is in either of the limit positions being less than the distance between said side walls and shaft axis by an amount less than twice the predetermined wall thickness of the tubes, the smaller throw of said cam extending at right angles to said side walls when the cam is in either of its limit positions being less than the spacing of said side walls and shaft axis by an amount substantially equal to the diameter of said tubes.

4. A double acting valve for controlling fluid flow through a pair of tubes having resiliently deformable walls of predetermined thickness comprising a valve body having a top wall and a pair of spaced apart end walls depending from the top wall, a pair of spaced apart side walls depending from the top wall, the end walls being provided with two pairs of coaxially aligned tube receiving apertures having bordering edge portions next adjacent said side walls, the top wall being provided with a slot connecting each pair of apertures for the insertion of the tubes laterally into the apertures whereupon the tubes will extend between said end walls and along said side walls, a shaft journalled on said top wall and extending downwardly thereof in centered relation between said side walls, said shaft extending beyond said top wall and outwardly of the valve body, means on the outer end of the shaft for rotating the same, and a tube engageable cam carried by said shaft including a cylindrical member circumscribing said shaft and mounted eccentrically of the shaft for movement therewith and an antifriction bearing surrounding said member and having a cylindrical outer race having a length greater than the diameter of the tubes, the axis of said shaft being spaced from one end wall a distance greater than the major throw of the cam and being spaced from the other end wall a predetermined distance less than the major throw of the cam so that in both directions of rotation of the shaft the cam will engage said other end wall to limit rotation of the cam, said predetermined distance being selected so that the major throw of said cam extends from the shaft axis angularly toward said other wall in both rotational limit positions of the cam, the larger throw of said cam extending at right angles to said side walls when the cam is in either of the limit positions being less than the distance between said side walls and shaft axis by an amount less than twice the predetermined wall thickness of the tubes, the smaller throw of said cam extending at right angles to said side walls when the cam is in either of its limit positions being less than the spacing of said side walls and shaft axis by an amount substantially equal to the diameter of said tubes.

References Cited in the file of this patent

UNITED STATES PATENTS

| 771,473 | Hooper | Oct. 4, 1904 |
| 2,285,974 | Huber | June 9, 1942 |
| 2,721,052 | Hill | Oct. 18, 1955 |
| 2,730,129 | Dall | Jan. 10, 1956 |

FOREIGN PATENTS

| 619,098 | France | Dec. 27, 1926 |
| 646,167 | Great Britain | Nov. 15, 1950 |
| F12854 | Germany | July 5, 1956 |